United States Patent
Vögel (10) Patent No.: US 8,365,550 B2
(45) Date of Patent: Feb. 5, 2013

(54) AIRCRAFT AIR CONDITIONING SYSTEM AND METHOD OF OPERATING AN AIRCRAFT AIR CONDITIONING SYSTEM

(75) Inventor: Franz Martin Vögel, Lindenberg (DE)

(73) Assignee: Liebherr-Aerospace Lindenberg GmbH, Lindenberg/Allgäu (DE)

( * ) Notice: Subject to any disclaimer, the term of this patent is extended or adjusted under 35 U.S.C. 154(b) by 1237 days.

(21) Appl. No.: 11/879,055

(22) Filed: Jul. 16, 2007

(65) Prior Publication Data

US 2008/0032616 A1 Feb. 7, 2008

(30) Foreign Application Priority Data

Jul. 17, 2006 (DE) .......................... 10 2006 032 979

(51) Int. Cl.
*F25D 9/00* (2006.01)
*F25B 9/00* (2006.01)
*B64D 13/02* (2006.01)

(52) U.S. Cl. .................... 62/401; 62/86; 62/87; 62/172; 62/402; 454/74

(58) Field of Classification Search ................ 62/86, 87, 62/402, 401
See application file for complete search history.

(56) References Cited

U.S. PATENT DOCUMENTS

| | | | |
|---|---|---|---|
| 2,929,224 A | 3/1960 | Pickard et al. | |
| 4,261,416 A | 4/1981 | Hamamoto | |
| 4,308,993 A | 1/1982 | Buss | |
| 4,430,867 A * | 2/1984 | Warner | 62/402 |
| 4,580,406 A * | 4/1986 | Nims | 62/87 |
| 4,684,081 A | 8/1987 | Cronin | |
| 5,131,235 A * | 7/1992 | Watanabe | 62/172 |
| 5,214,935 A | 6/1993 | Brunskill | |
| 6,295,822 B1 * | 10/2001 | Mueller | 62/172 |
| 6,415,621 B2 * | 7/2002 | Buchholz et al. | 62/402 |
| 6,427,471 B1 * | 8/2002 | Ando et al. | 62/402 |
| 6,629,428 B1 * | 10/2003 | Murry | 62/401 |
| 2005/0034469 A1 * | 2/2005 | Ochiai | 62/239 |

FOREIGN PATENT DOCUMENTS

| | | |
|---|---|---|
| DE | 19935918 | 2/2001 |
| DE | 10234968 | 2/2004 |
| EP | 1595788 | 11/2005 |
| EP | 1609718 | 12/2005 |
| FR | 2349799 | 11/1977 |
| FR | 2509842 | 1/1983 |

* cited by examiner

*Primary Examiner* — Marc Norman
*Assistant Examiner* — Filip Zec
(74) *Attorney, Agent, or Firm* — Dilworth & Barrese, LLP (57) ABSTRACT

This invention relates to an aircraft air conditioning system with at least one compressor, a first conduit connected with a pressure side of the compressor and at least one cooling unit provided downstream of the compressor. A second bypass conduit is connected with the pressure side of the compressor to conduct at least part of the compressed air around at least one cooling unit and has a throttle for varying air flow therethrough.

24 Claims, 6 Drawing Sheets

AIRCRAFT AIR CONDITIONING SYSTEM AND METHOD OF OPERATING AN AIRCRAFT AIR CONDITIONING SYSTEM

BACKGROUND OF THE INVENTION

This invention relates to an aircraft air conditioning system with at least one compressor, comprising a first conduit which is connected with the pressure side of the compressor and in which one or more cooling means provided downstream of the compressor are arranged for cooling the air compressed in the compressor, and comprising a second conduit designed as bypass conduit, which likewise is connected with the pressure side of the compressor and is arranged such that it conducts at least part of the air compressed in the compressor in a bypass around at least one of the cooling means, wherein a throttle means is arranged in the bypass conduit, by means of which the mass flow of the air conducted through the bypass conduit can be varied.

Aircraft air conditioning systems, which include compressors supplied with ambient air or precompressed air, are known in a number of different embodiments. A problem of electrically driven aircraft air conditioning systems for fresh air supply, air conditioning and pressurization consists in that with a specified mass flow rate, the pressure conditions on the compressor outlet side are changed due to the adjustment of the throttle means arranged in the bypass conduit, which in turn leads to the fact that the temperature of the compressed air is changed as well.

Figure 1:
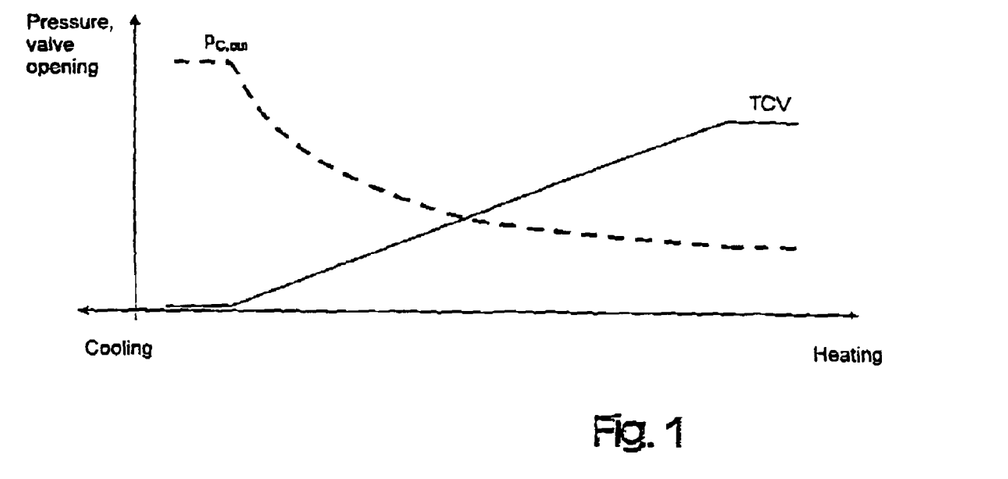
FIG. 1: shows a representation of the dependence of the compressor outlet pressure on the opening of a prior art throttle valve (TCV) arranged in the bypass conduit.

FIG. 1 shows these connections and illustrates that when opening the valve TCV, which is provided in said bypass conduit, the pressure on the valve outlet side drops, which leads to a decrease in temperature. The correspondingly reverse process takes place when throttling the valve TCV, whereby on the one hand the mass flow of the air conducted through the bypass conduit is reduced, but on the other hand the pressure at the compressor outlet is increased, which attenuates or eliminates the effect of the desired change in temperature. Thus, it should be noted that when diverting a partial mass flow around the means provided for cooling with the intention to raise the temperature obtained after recombining the air flows, the transmittance of the total system is increased by opening the valve TCV, which effects, however, that the air temperature at the compressor outlet is decreasing due to the drop in pressure. Depending on the ambient condition, the one or the other effect now prevails. In the extreme case, opening the valve TCV, which per se should effect a supply of warm air, can lead to the fact that the air supplied to the mixing chamber or the aircraft cabin undergoes no change in temperature at all, as the temperature at the compressor outlet has dropped due to the decrease in pressure existing there.

In summary it should be noted that in prior art systems a reproducible correlation between the variation of the opening of the throttle means provided in the bypass conduit on the one hand and the change in temperature realized thereby on the other hand does not exist or can only be realized with difficulty. Therefore, it is the object of the invention to develop an aircraft air conditioning system of the type mentioned above such that the temperature control or temperature regulation is simplified by varying the opening of the throttle means provided in the bypass conduit.

SUMMARY OF THE INVENTION

This object is solved by an aircraft air conditioning system with the features herein.

Accordingly, it is provided that also in the first conduit, which includes said cooling means, a throttle means is arranged, by means of which the mass flow of the air conducted through the first conduit can be varied.

In accordance with the invention a unit is provided, which can be operated in a first and/or in a second operating mode. The unit can be designed such that it can be operated exclusively in the first operating mode. It can also be designed such that it can be operated exclusively in the second operating mode. In a further alternative, it can also be designed such that it can selectively be operated in the first or in the second operating mode.

The unit is designed such that in the first operating mode, when the opening of the throttle means provided in the bypass conduit is increased, it effects a reduction of the opening of the throttle means provided in the first conduit and, inversely, when the opening of the throttle means provided in the bypass conduit is reduced, it effects an increase of the opening of the throttle means provided in the first conduit. Due to the creation of a throttle means in the mass flow, which is directed over the cooling means, it is possible to make the conditions at the compressor outlet such that the variation of the opening of the throttle means arranged in the bypass conduit does not or only insignificantly lead to a change in the level of the compressor outlet pressure. In this way, a constant reproducible connection between the valve position of the throttle means of the bypass conduit and the temperature of the air flow supplied to the mixing chamber or aircraft cabin can be achieved.

In the second operating mode, the unit effects an increase of the opening of the throttle means provided in the bypass conduit and an increase of the opening of the throttle means provided in the first conduit or a reduction of the opening of the throttle means provided in the bypass conduit and a reduction of the opening of the throttle means provided in the first conduit. Such operating mode can be chosen when the transmittance of the aircraft air conditioning system should be controlled or regulated. When the transmittance of the aircraft air conditioning system should be increased, the openings of both throttle means are increased; when the transmittance of the aircraft air conditioning system should be reduced, the openings of both throttle means are reduced.

It is likewise conceivable that the unit is designed such that in principle it can be operated in both operating modes, i.e. if necessary in a temperature regulation mode or temperature control mode (first operating mode) and if necessary in a transmittance regulation mode or transmittance control mode (second operating mode). The choice of the operating mode can depend for instance on the ambient conditions in ground operation or during the flight.

In a further aspect of the invention it is provided that the change of the openings of the throttle means is effected such that the pressure at the compressor outlet remains constant or substantially constant when the openings are changed. In contrast to prior art aspects it is thus provided that a variation of the compressor outlet pressure is prevented or largely prevented by changing the opening of the throttle means provided in the bypass conduit.

Preferably, the unit is designed as a temperature control unit. One or more temperature sensors connected with this control unit can be provided, which measure the temperature of the air at a suitable point in the aircraft air conditioning system, the temperature control unit being designed such that upon detection of a deviation between actual and desired value it varies the opening of the throttle means provided in the bypass conduit for the purpose of reducing the deviation between actual and desired value. In accordance with the invention, there is also effected a variation of the opening of the throttle means provided in the first conduit.

It is conceivable for instance that the temperature sensor is arranged downstream of the opening of the bypass conduit into the first conduit, i.e. detects the mixing temperature, and that this value is used as variable to be controlled. Of course, other arrangements of the temperature sensor are also conceivable.

In particular, the temperature sensor can also be arranged before, i.e. upstream of the orifice point of the bypass conduit opening into the first conduit.

Said cooling means provided in the first conduit can be formed by a ram-air heat exchanger, which is cooled by ram or ambient air, and/or by a vapor cycle and/or by a turbine for expanding air compressed in the compressor.

In the first conduit, there can be arranged a turbine for expanding the air compressed in the compressor and a water separation circuit upstream of the turbine.

In a further aspect of the invention it is provided that in the first conduit a turbine is arranged for expanding air compressed in the compressor, and that the turbine with the compressor is seated on a shaft and forms an air cycle machine.

The compressor can be power-operated, wherein the motor likewise can be seated on the shaft on which the compressor and the turbine are provided.

In principle, the compressor can be of the one-stage or multi-stage type. It is conceivable that the compressor is formed by a plurality of compressor units, which are of the one-stage or multi-stage type and are arranged separately one behind the other or are connected with each other by a shaft. In a further aspect of the invention it can be provided that between the compressors or between the compressor stages an intermediate cooling is provided. Embodiments without such intermediate cooling are of course also conceivable.

Apart from said compressor, one or more further power-operated compressors can be provided, which are operable independent of the compressor and parallel thereto.

In a further aspect of the invention it is provided that the two throttle means are designed as separate components or as a uniform component. It is conceivable for instance that this uniform component constitutes a valve, which can change the transmittance through the first conduit and the transmittance through the bypass conduit at the same time. For instance, a plunger is conceivable, which can be reciprocated such that when moving in one direction it reduces the transmittance of the first conduit and at the same increases the transmittance of the bypass conduit, and when moving in the other direction reduces the transmittance through the bypass conduit and increases the transmittance through the first conduit. For this purpose, any design of such valve is conceivable, for instance also a conical design of a valve plunger or valve seat, by means of which any characteristic can be realized, such as the transmittance of the throttle means depends on the position of the plunger or valve body.

In a further aspect of the invention it is provided that a mass flow control unit is provided for controlling the mass flow through the aircraft air conditioning system, wherein there are provided one or more flow rate measuring means connected with the mass flow control unit as well as actuators by means of which the mass flow can be varied.

The actuators can be formed by means for adjusting the speed of a motor driving the compressor.

The mass flow control unit and the temperature control unit can be formed by different components or also by one and the same processor or controller.

The aircraft air conditioning system can include a turbine for expanding the air compressed in the compressor, and the bypass conduit can open into the first conduit downstream of the turbine. In principle, other orifice points are also conceivable.

In a further aspect of the invention it is provided that the aircraft air conditioning system includes a turbine for expanding the air compressed in the compressor and a condenser, which is provided downstream of the turbine such that the turbine outlet air traverses the cold side of the condenser, and that the bypass conduit opens into the first conduit downstream of the condenser.

Furthermore, it can be provided that in the first conduit a ram-air heat exchanger and a water separation circuit are arranged, and that the throttle means arranged in the first conduit is arranged upstream of the ram-air heat exchanger between the ram-air heat exchanger and the water separation circuit or is provided downstream of the water separation circuit.

In a further aspect of the invention it is provided that a connecting conduit is arranged, which connects the outlet of the compressor(s) with the inlet thereof, and that in the connecting conduit a valve is arranged, by means of which the mass flow of the air flowing through the connecting conduit can be changed. There can be provided a further control unit, which controls the temperature of the compressor outlet air, wherein the actual temperature value is detected by a temperature sensor and wherein the valve of the connecting conduit serves as an actuator.

The throttle means provided in the first conduit can also be formed by a variable turbine nozzle. Thus, it is conceivable that the change in the transmittance or mass flow rate is performed by the turbine nozzle, which involves the advantage that no additional elements or throttle means must be provided. Thus, the turbine nozzle alone can effect the change in the transmittance of the first conduit. It is also conceivable to provide a plurality of nozzle means, one of which is formed by the variable turbine nozzle, so that the function of varying the transmittance or the mass flow rate is also performed by the variable turbine nozzle.

The term "throttle means" thus not only refers to elements which "destroy" energy, such as a valve, but also those which convert the energy, such as said turbine nozzle.

The invention furthermore relates to a method with the features herein. Preferred aspects of the method are also the subject matter herein.

BRIEF DESCRIPTION OF THE DRAWINGS

Further details and advantages of the invention will be explained in detail with reference to an embodiment illustrated in the drawing, in which.

DESCRIPTION OF THE PREFERRED EMBODIMENTS

Figure 3:
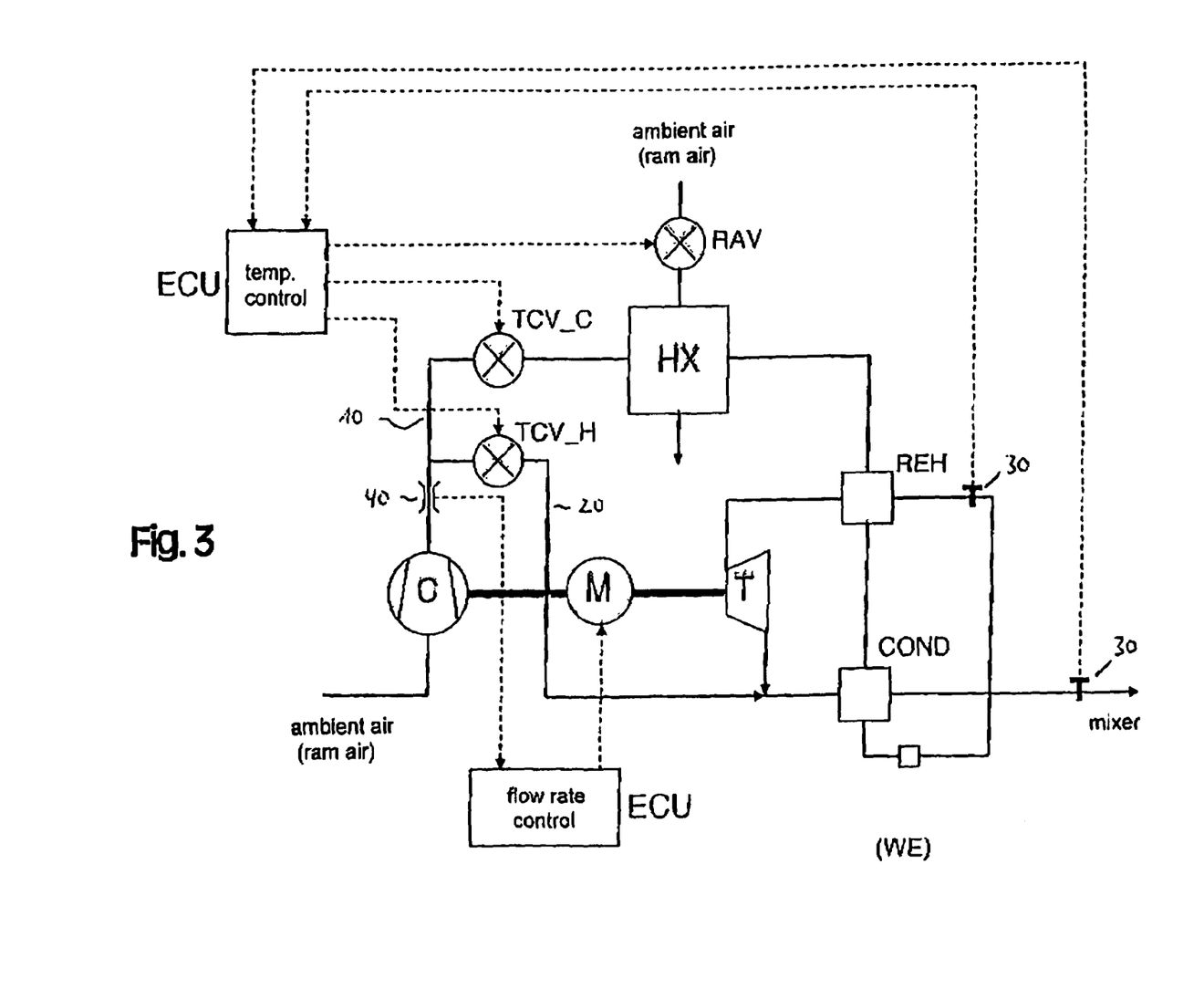
FIG. 3: shows a schematic representation of an aircraft air conditioning system in accordance with the invention.

FIG. 3 shows the aircraft air conditioning system in accordance with the invention in a first schematic representation.

On the inlet side, the compressor C is supplied with ambient or ram air or for instance also with precompressed air. On the pressure side of the compressor, the first conduit 10 is provided, from which branches a bypass conduit 20.

Subsequent to this branching, the first conduit 10 includes a throttle means TCV_C, by means of which the mass flow through the first conduit can be varied. Downstream of this throttle means, the ram-air heat exchanger HX is provided, which is traversed by ram or ambient air and on its warm side is traversed by the compressor outlet air, which undergoes cooling in the heat exchanger HX.

The mass flow of the ambient or ram air is varied by means of the valve RAV provided on the ram air side, as is indicated in FIG. 3.

The compressed air cooled in the ram-air heat exchanger HX then flows into the reheater REH and subsequently into the condenser COND, in which water in the compressed air is condensed. The water is separated in the downstream water separator WE. The air dehumidified in this way then flows through the reheater REH, where it is slightly heated, and then into the turbine T, in which it is expanded and thereby undergoes a considerable decrease in temperature. The air cooled in this way then flows through the cold side of the condenser COND. Subsequently, it is supplied to a mixing chamber or the aircraft cabin.

As is furthermore shown in FIG. 3, the bypass conduit 20 opens into the first conduit 10 downstream of the turbine T.

Reference numeral 30 designates temperature sensors, one of which is disposed downstream of the condenser COND. Due to its arrangement, it measures the temperature of the mixed air, which consists of the air conducted through the bypass conduit 20 and the air conducted through the first conduit 10. As shown in FIG. 3, mixing the two air flows is effected between turbine T and condenser COND.

Alternatively or in addition, a further temperature sensor 30 can be provided, which is disposed between the water separator WE and the reheater REH, as shown in FIG. 3. The temperature sensors 30 provide the actual temperature value to a temperature control unit ECU, as is indicated by arrows in FIG. 3.

As can furthermore be taken from FIG. 3, the bypass conduit 20 includes a throttle means TCV_H. As stated above, a further throttle means TCV_C is provided in the first conduit 10, in which the cooling means are arranged, namely in the present example the ram-air heat exchanger HX and the turbine T. Beside the cooling means illustrated here, further cooling means can also be provided, such as a vapour cycle.

The operation of the arrangement shown in FIG. 3 is as follows:

If the one or more temperature sensors 30 indicate an actual temperature value which lies below a desired temperature value, the temperature control unit ECU effects an increase of the opening of the throttle means or the throttle valve TCV_H arranged in the bypass conduit 20, which leads to the fact that warmer air is supplied in the mixing point. At the same time, however, the temperature control unit effects that the transmittance of the throttle means TCV_C provided in the first conduit 10 is reduced, so that the pressure conditions at the compressor outlet remain constant or largely constant. Thus, it is the function of the valve TCV_C to prevent or compensate a pressure drop at the compressor outlet, which in prior art systems would be caused by opening the valve TCV_H, which is effected by correspondingly reducing the transmittance through the valve TCV_C. The corresponding reverse process takes place when the valve TCV_H is throttled.

Figure 2:
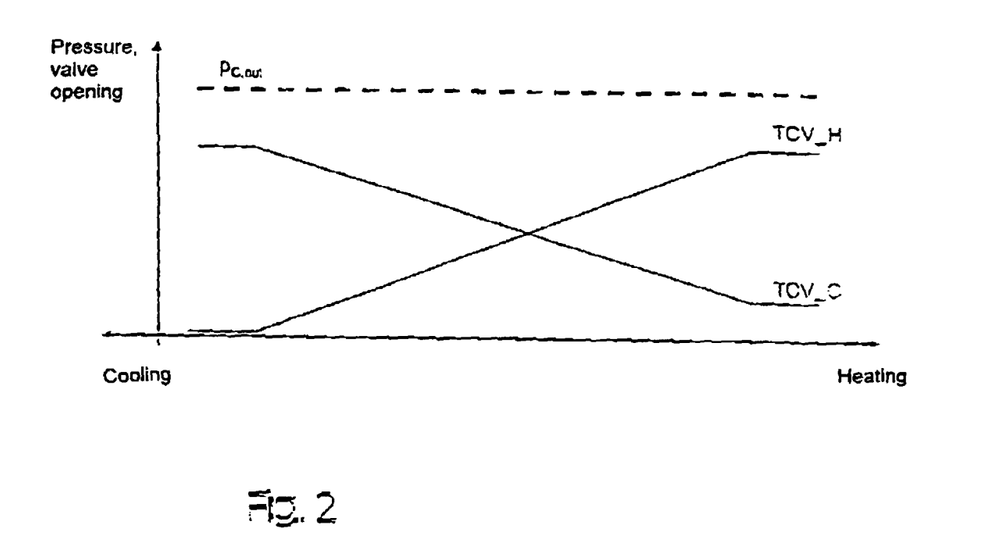
FIG. 2: shows a representation as shown in FIG. 1 in accordance with the invention.

This leads to the fact that the pressure conditions at the compressor outlet are largely independent of the opening condition or the transmittance of the valve TCV_H provided in the bypass conduit 20. These conditions are schematically illustrated in FIG. 2. This Figure shows that the transmittance of the throttle means TCV_H and TCV_C are changed relative to each other such that the pressure at the compressor outlet remains approximately constant.

Thus, the pressure at the compressor outlet is independent of the degree of opening of the valve TCV_H, and a continuous and reliable temperature control is possible by means of the actuator TCV_H.

As can furthermore be taken from FIG. 3, the temperature control unit ECU also influences the transmittance of the valve RAV, which controls the mass flow of the ambient or ram air flowing into the ram-air heat exchanger HX.

Parallel to the control of the temperature, a flow-rate control is provided, as is likewise shown in FIG. 3. The actual value of the opening is determined by a flow-rate measuring means 40 arranged at the compressor outlet. The flow-rate control unit ECU makes a comparison between desired value and actual value, and in the case of a deviation influences the speed of the motor M driving the compressor C.

As can furthermore be taken from FIG. 3, the motor driving the compressor C, the compressor C and the turbine T form an air cycle machine, which is seated on a shaft.

Figure 4:
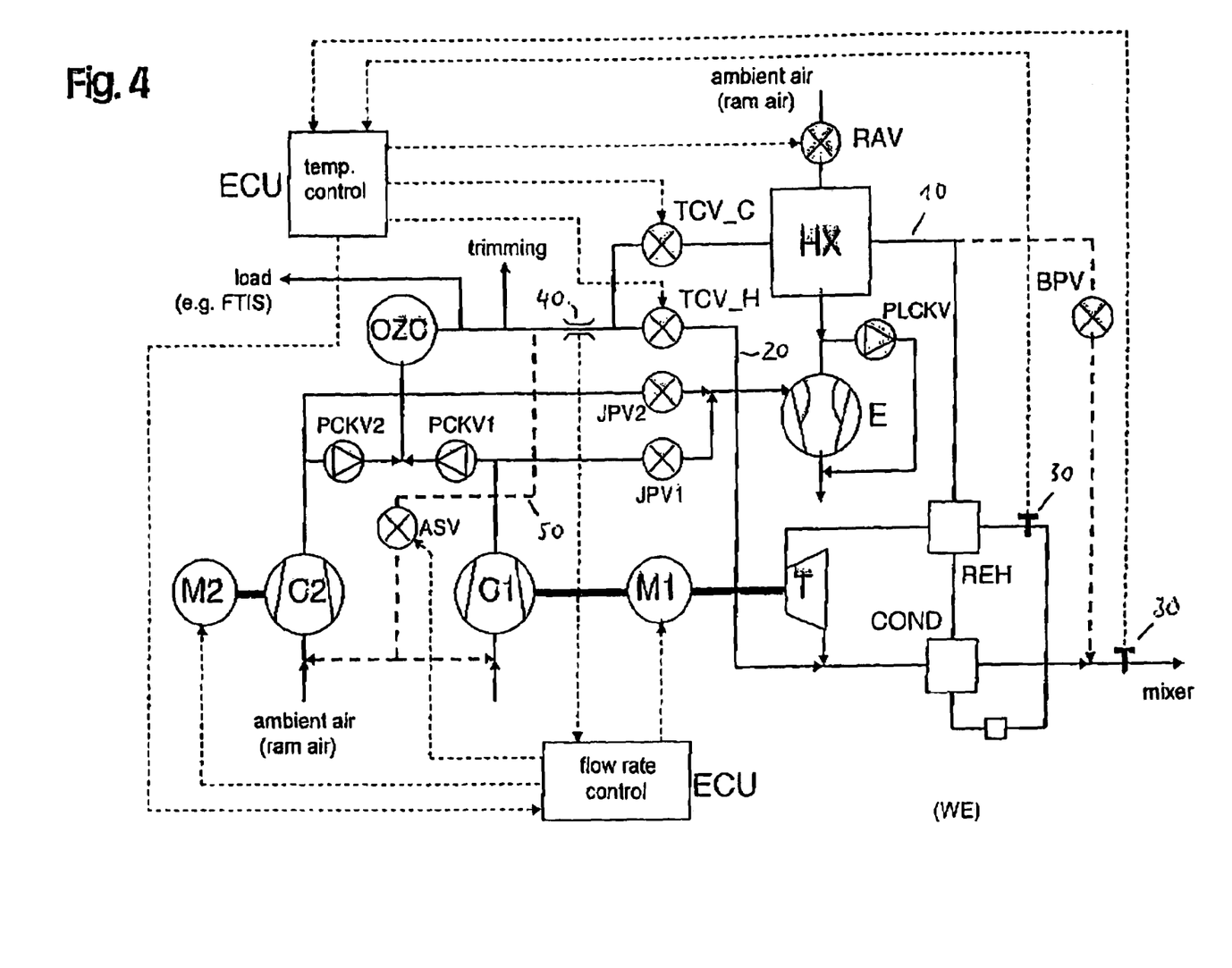
FIGS. 4-6: show different representations of an aircraft air conditioning system in accordance with the invention with throttle means arranged at different positions.

FIG. 4 shows a further embodiment of the aircraft air conditioning system of the invention. As can be taken from FIG. 4, there is provided a first compressor C1 which is driven by a first motor M1, wherein the first compressor C1, the first motor M1 and the turbine T form an air cycle machine.

In addition to the first compressor C1, there is provided a further compressor C2 supplied with ambient or ram air or precompressed air, which is driven by a second motor M2. In the compressor outlet conduits of both compressors C1, C2, check valves PCKV1 and PCKV2 are provided. Finally, the two compressor outlets are combined. The compressed air combined in this way is passed over the unit OZC, which is a converter for ozone and/or hydrocarbons. By means of the sensor 40, the flow rate of the compressed air is detected and used for flow-rate control by means of the unit ECU, which in the case of a deviation from the desired value changes the speed of the motor M1. As has already been explained with respect to FIG. 3, a bypass conduit 20 branches off from the first conduit 10, in which the cooling means in the form of the ram-air heat exchanger HX and the turbine T are arranged, and opens into the first conduit 10 on the outlet side of the turbine T. With respect to the arrangement and function of the throttle means TCV_H and TCV_C, reference is made to the description of FIG. 3.

As can furthermore be taken from FIG. 4, a jet pump E is provided in the ram air passage, which is supplied with compressed air via the jet pump modulating valves JPV1 and JPV2 and which has the function to effect a movement of air through the ram air passage. The jet pump modulating valves JPV1 and JPV2 are supplied with compressed air from the compressor. The ram air passage includes two passage portions extending in parallel, in one of which the jet pump E is arranged. In the other passage extending in parallel, the check valve PLCKV is provided. In flight operation, this passage is traversed by ram air. The check valve PLCKV has the function to prevent a circular flow in the ram air passage.

In addition to the arrangement shown in FIG. 3, the aircraft air conditioning system of FIG. 4 includes a further bypass conduit, which downstream of the ram-air heat exchanger HX branches off from the first conduit 10 and which opens downstream of the mixing point between bypass conduit 20 and first conduit 10, as can be taken from FIG. 4. In this conduit, the adjustable bypass valve BPV is provided. The bypass conduit including the valve BPV can also open at some other point. It is conceivable for instance that the bypass conduit opens upstream of the mixing point between bypass conduit 20 and first conduit 10, as can be taken from FIG. 5.

As can likewise be taken from FIG. 4, a conduit 50 is provided, which connects the common pressure conduit of the compressors C1 and C2 with the compressor inlets. In this conduit 50, a valve ASV (anti-surge valve) is provided, which in the open condition connects the pressure side of the compressor with the suction side of the compressor. It is provided that for two compressors C1, C2 only one anti-surge valve or one conduit 50 is provided, which downstream of the valve ASV splits to extend to both compressor inlets. The valve ASV is actuated by the flow-rate control unit. The valve ASV is used to avoid any surge and also serves to adjust the temperature of the compressor outlet air to a desired value. For this purpose, the temperature of the compressor outlet air is measured and compared with a desired value in a control unit. If a control deviation is detected, the transmittance of the valve ASV is changed, and thus a greater or smaller amount of hot air is supplied to the compressor inlets. In this way, the temperature of the compressor outlet air can be controlled.

Figure 5:
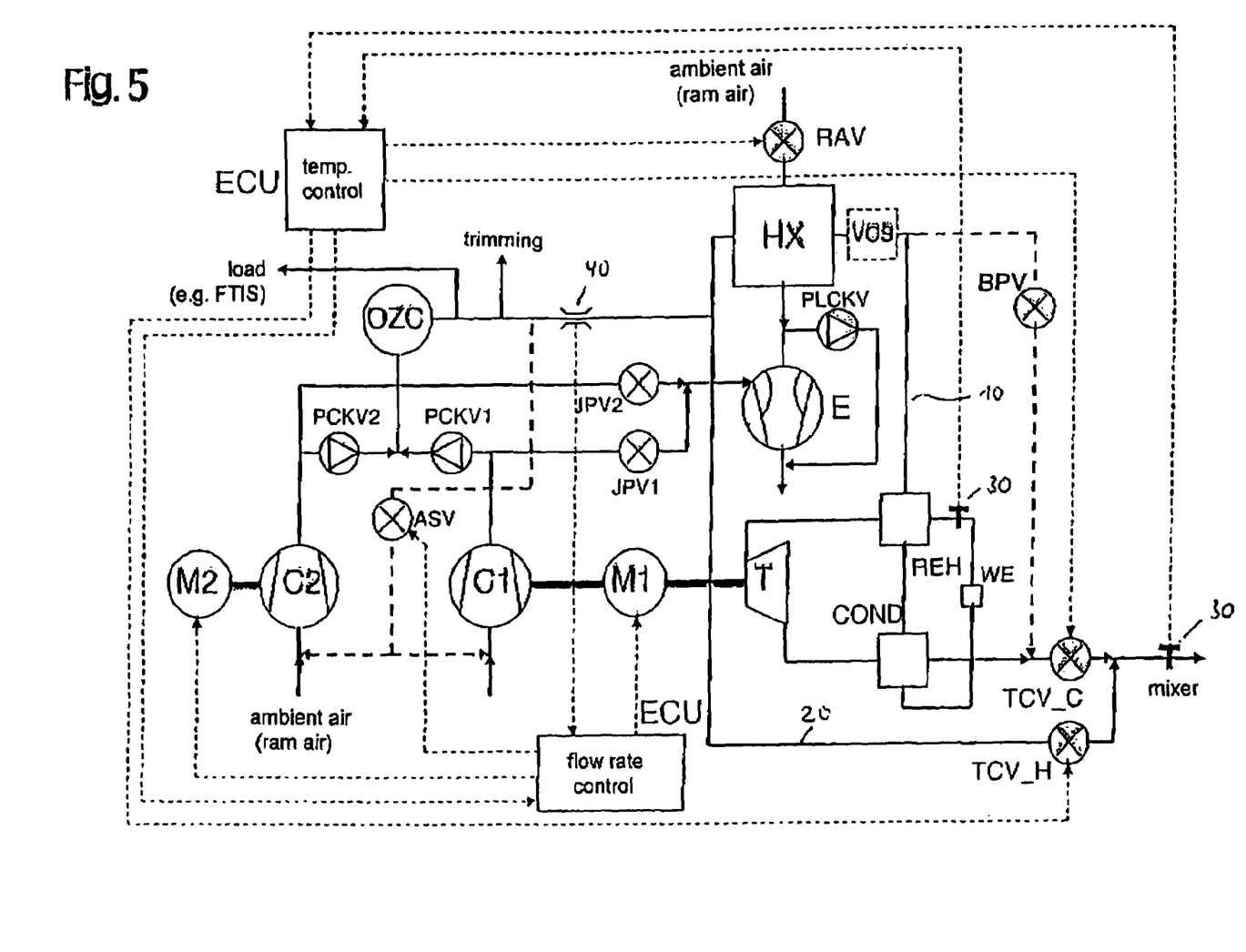

FIG. 5 shows a further arrangement of the aircraft air conditioning system of the invention, which differs from the one of FIG. 4 by the arrangement of the throttle means. As can be taken from FIG. 5, both throttle means TCV_C, TCV_H are disposed directly before the mixing point at which the bypass conduit 20 opens into the first conduit 10. In the example shown here, the throttle means TCV_C provided in the first conduit 10 thus is arranged downstream of the water separation means, i.e. in this case downstream of the cold side of the condenser COND.

Figure 6:
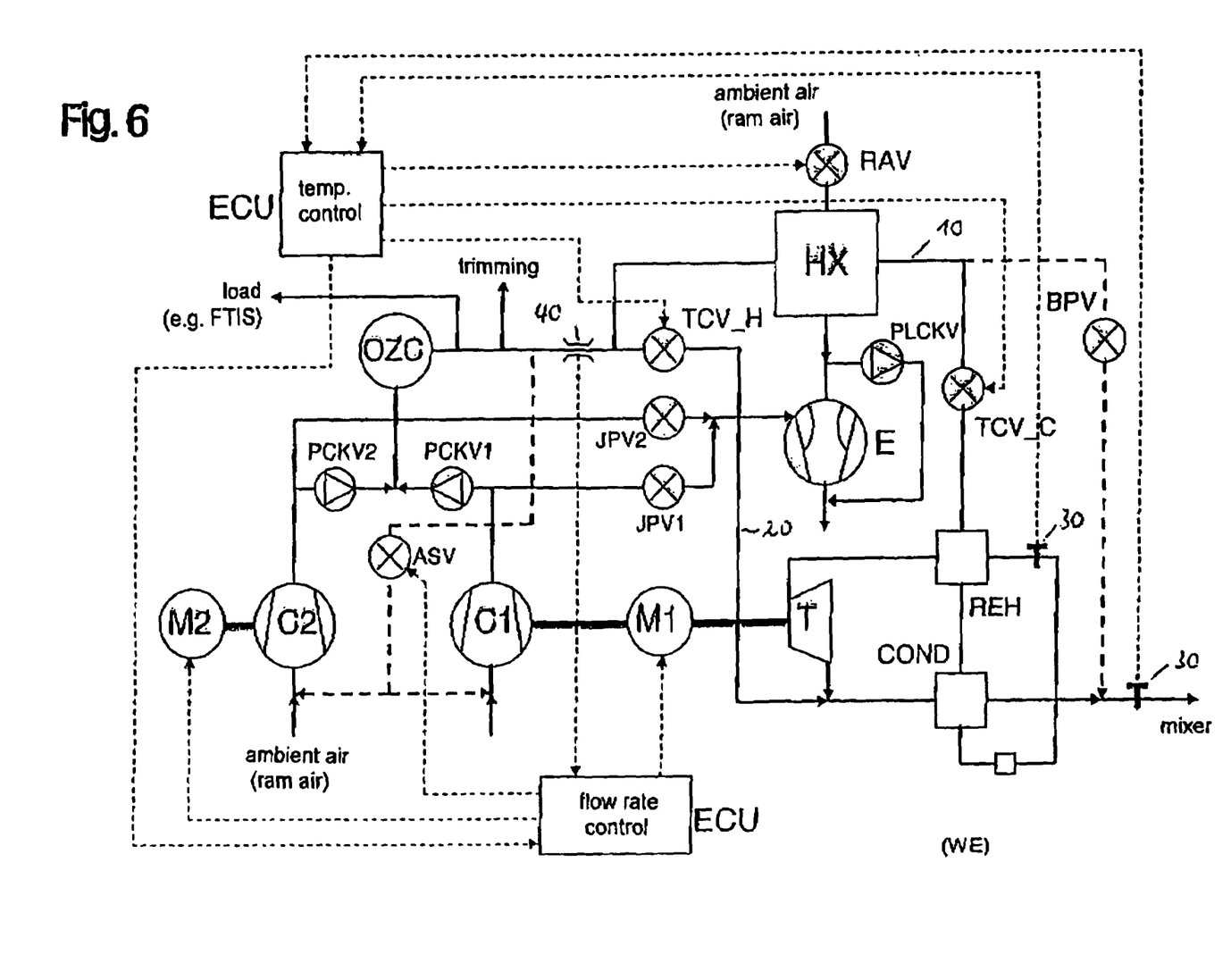

In the arrangement shown in FIG. 6, the throttle means TCV_C arranged in the first conduit 10 is provided in the portion between the ram-air heat exchanger HX and the water separation circuit, i.e. upstream of the reheater REH.

Figure 7:
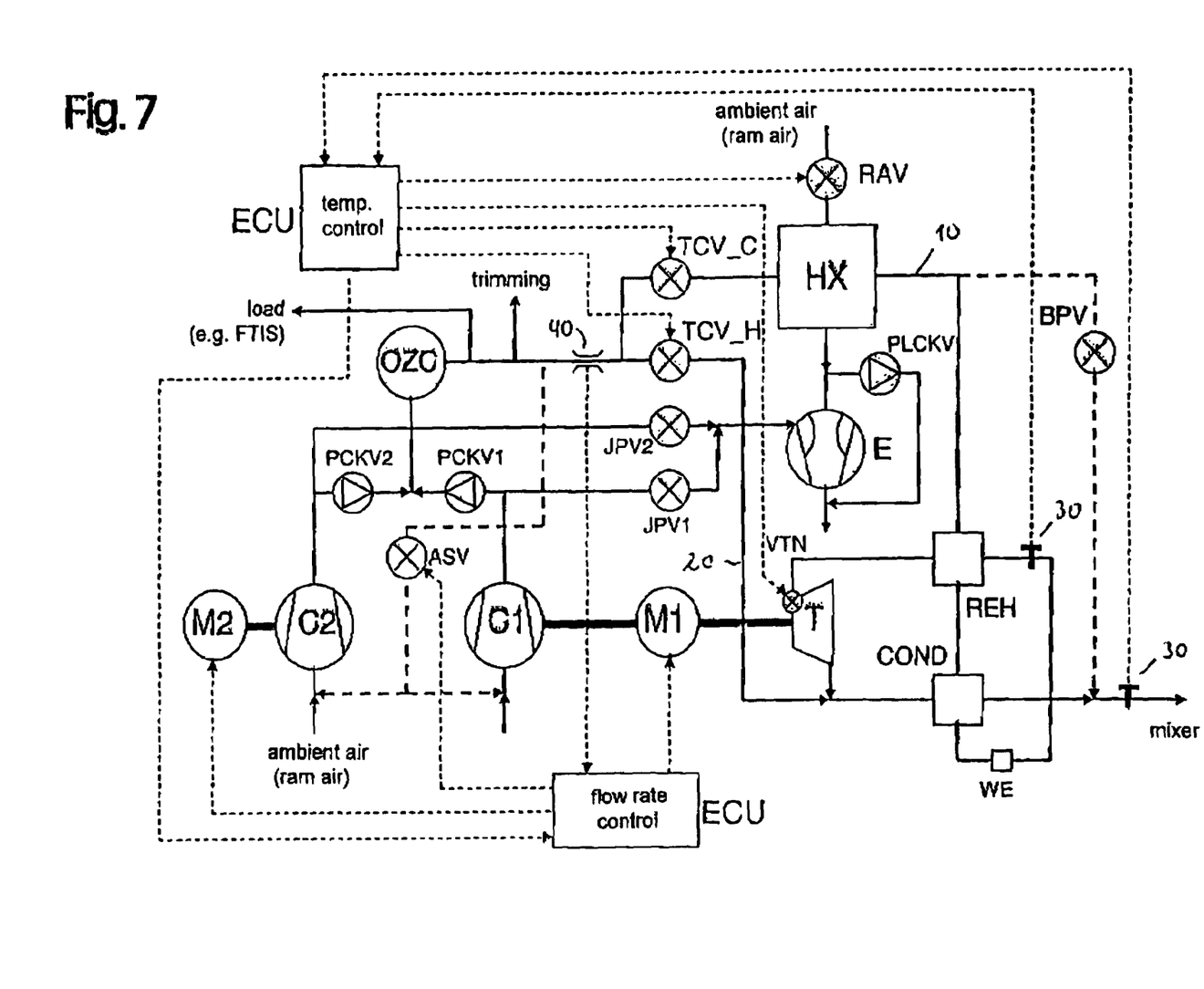
FIG. 7: shows a further schematic representation of an aircraft air conditioning system in accordance with the invention with variable turbine nozzle.

FIG. 7 finally shows an arrangement in which in addition to the throttle means TCV_C a turbine nozzle VTN is provided in the first conduit 10. In addition to the throttle means TCV_C or alternatively, the turbine nozzle VTN can effect the desired change of the flow rate or mass flow in the first conduit 10 in accordance with the invention.

The invention claimed is:

1. An aircraft air conditioning system with at least one compressor (C), comprising
a first conduit (10) which is connected with the pressure side of the compressor (C) and in which one or more cooling means provided downstream of the compressor (C) are arranged for cooling the air compressed in the compressor (C),
a single turbine (T) arranged in the first conduit (10), and
a second conduit designed as bypass conduit (20), which is connected with the pressure side of the compressor (C) and arranged such that it conducts at least part of the air compressed in the compressor (C) in a bypass around at least one of the cooling means and with said single turbine (T) arranged in said first conduit (10) just upstream of the return junction with said second conduit (20), wherein
a bypass throttle means (TCV_H) is arranged in the bypass conduit (20), by which the mass flow of the air conducted through the bypass conduit (20) can be varied,
in the first conduit (10) a first throttle means (TCV_C, VTN) is arranged, by which the mass flow of the air conducted through the first conduit (10) can be varied,
a single unit (ECU) is provided, which is designed such that it can be operated in a first operating mode, second operating mode, or both first and second operating modes,
in the first operating mode, when opening of the bypass throttle means (TCV_H) provided in the bypass conduit (20) is increased, the unit (ECU) effects reduction of opening of the first throttle means (TCV_C, VTN) provided in the first conduit (10),
inversely, when opening of the bypass throttle means (TCV_H) provided in the bypass conduit (20) is reduced, the unit (ECU) effects increase of opening of the first throttle means (TCV_C, VTN) provided in the first conduit (10),
in the second operating mode, the unit (ECU) effects increase of opening of both the bypass throttle means (TCV_H) provided in the bypass conduit (20) and first throttle means (TCV_C, VTN) provided in the first conduit (10) or reduction of opening of both the bypass throttle means (TCV_H) provided in the bypass conduit (20) and first throttle means (TCV_C, VTN) provided in the first conduit (10), and
with pressure at an outlet of said compressor (C) remaining essentially constant in all said operating modes.

2. The aircraft air conditioning system according to claim 1, wherein the unit (ECU) is designed such that the change of the openings of both throttle means (TCV_C, TCV_H) is effected with a pressure at the compressor outlet remaining constant when the openings are changed.

3. The aircraft air conditioning system according to claim 1, wherein the compressor (C) is arranged such that it is supplied with ambient or ram air or with precompressed air.

4. The aircraft air conditioning system according to claim 1, wherein the unit (ECU) is designed as a temperature control unit operating in the first operating mode and that there are provided one or more temperature sensors (30) connected with the temperature control unit, which measure the temperature of the air in the aircraft air conditioning system, wherein the temperature control unit is designed such that upon detection of a deviation between the actual temperature value measured by the temperature sensor(s) (30) and a specified desired temperature value it varies the opening of the throttle means (TCV_H) provided in the bypass conduit (20) for the purpose of reducing the control deviation.

5. The aircraft air conditioning system according to claim 4, wherein the bypass conduit (20) opens into the first conduit (10) and the one or more temperature sensors (30) in the first conduit (10) are arranged before, behind or both before and behind an orifice point of the bypass conduit (20) opening into the first conduit (10).

6. The aircraft air conditioning system according to claim 1, wherein the cooling means provided in the first conduit (10) are formed by a heat exchanger (HX) cooled with ram or ambient air and/or by a vapor cycle and/or by a turbine (T) for expanding air compressed in the compressor (C).

7. The aircraft air conditioning system according to claim 1, wherein the turbine (T) expands air compressed in the compressor (C) and a water separation circuit is provided upstream of the turbine (T).

8. The aircraft air conditioning system according to claim 1, wherein the turbine (T) and compressor (C) are seated on a shaft.

9. The aircraft air conditioning system according to claim 8, wherein the compressor (C), the turbine (T) and a motor (M) are all seated on the shaft.

10. The aircraft air conditioning system according to claim 1, wherein at least one motor (M) connected with the compressor (C) is provided for driving the compressor (C).

11. The aircraft air conditioning system according to claim 1, wherein the compressor (C) is of the one-stage or multistage type.

12. The aircraft air conditioning system according to claim 1, wherein the throttle means (TCV_H) provided in the bypass conduit (20) and the throttle means (TCV_C) provided in the first conduit (10) are designed as separate components or are formed by one common assembly.

13. The aircraft air conditioning system according to claim 1, wherein a mass flow control unit (ECU) is provided for controlling the mass flow through the aircraft air conditioning system, one or more flow rate measuring means (40) connected with the mass flow control unit as well as actuators are provided, by which the mass flow can be varied.

14. The aircraft air conditioning system according to claim 13, wherein the actuator(s) is(are) formed by means for adjusting the speed of a motor (M) driving the compressor (C).

15. The aircraft air conditioning system according to claim 13, wherein the mass flow control unit (ECU) and the temperature control unit (ECU) are formed by different components or by a controller.

16. The aircraft air conditioning system according to claim 1, wherein the bypass conduit (20) opens into the first conduit (10) downstream of the turbine (T).

17. The aircraft air conditioning system according to claim 1, configured such that in the first operating mode, pressure at the pressure side of the compressor (C) remains substantially constant and independent of degree of opening of the bypass throttle means (TCV_H), and
in the second operating mode, transmittance of air conditioning is respectively increased or reduced.

18. The aircraft air conditioning system according to claim 1, additionally comprising
at least one temperature sensor (30) arranged to indicate actual temperature value and forward the same to said unit (ECU), wherein
said unit (ECU) is configured to open or close said bypass throttle means (TCV_H) when the actual temperature value is below or above a desired temperature value and, at the same time, close or open said first throttle means (TCV_C) to maintain the pressure at the outlet of said compressor (C) substantially constant.

19. A method of operating an aircraft air conditioning system, in particular an aircraft air conditioning system with a compressor (C), comprising
a first conduit (10) which is connected with the pressure side of the compressor (C) and in which one or more cooling means provided downstream of the compressor (C) are arranged for cooling the air compressed in the compressor (C),
a single turbine (T) arranged in the first conduit, and
a second conduit designed as bypass conduit (20), which is connected with the pressure side of the compressor (C) and arranged such that it conducts at least part of the air compressed in the compressor (C) in a bypass around at least one of the cooling means and with said single turbine (T) arranged in said first conduit (10) just upstream of the return junction with said second conduit (20), wherein
a bypass throttle means (TCV_H) is arranged in the bypass conduit (20), by which the mass flow of the air conducted through the bypass conduit (20) can be varied,
in the first conduit (10) a first throttle means (TCV_C, VTN) is arranged, by which the mass flow of the air conducted through the first conduit (10) can be varied,
a single unit (ECU) controls opening and closing of both said first and bypass throttle means (TCV_C, VTN: TCV_H), and
when increasing an opening of the bypass throttle means (TCV_H) provided in the bypass conduit (20) a reduction of an opening of the first throttle means (TCV_C, VTN) provided in the first conduit (10) is effected and, inversely, when reducing the opening of the bypass throttle means (TCV_H) provided in the bypass conduit (20) an increase of the opening of the throttle means (TCV_C, VTN) provided in the first conduit (10) is effected, or
when increasing the opening of the bypass throttle means (TCV_H) provided in the bypass conduit (20) an increase of the opening of the throttle means (TCV_C, VTN) provided in the first conduit (10) is effected, and
when reducing the opening of the bypass throttle means (TCV_H) provided in the bypass conduit (20), a reduction of the opening of the first throttle means (TCV_C, VTN) provided in the first conduit (10) is effected,
such that pressure at an outlet of said compressor (C) remains essentially constant in all said opening and closing combinations of said first and bypass throttle means (TCV_C, VTN; TCV_H).

20. The method according to claim 19, wherein the openings of the throttle means (TCV_C, TCV_H) are changed such that the pressure at the compressor outlet is not changed by changing the openings of the throttle means (TCV_C, TCV_H).

21. The method according to claim 19, wherein the temperature of the air flowing through the aircraft air conditioning system is measured and compared with a desired value, and in the case of a deviation between desired value and actual value, a change of the opening of the throttle means (TCV_H) provided in the bypass conduit (20) is performed for the purpose of temperature control.

22. The method according to claim 21, wherein the bypass conduit (20) opens into the first conduit (10) at an orifice point, and the temperature measurement is performed downstream or upstream of the orifice point.

23. The method according to claim 21, wherein the aircraft air conditioning system has a water separation circuit including a reheater (REH), condenser (COND), and water separator (WE), and the temperature measurement is effected between the water separator (WE) and the reheater (REH).

24. The method according to claim 19, wherein independent of the temperature control a control of the mass flow of the compressor outlet air is effected.

* * * * *